INVENTORS
JOHN E. SCHRINER AND
CHARLES R. MASTERS
BY Oberlin + Limbach
ATTORNEYS.

2,915,427

METHOD OF MAKING A CONTOURED FLOOR MAT

John E. Schriner, Willoughby, and Charles R. Masters, Mentor-on-the-Lake, Ohio, assignors to The Eagle-Picher Company, Cincinnati, Ohio, a corporation of Ohio Application February 11, 1955, Serial No. 487,505

7 Claims. (Cl. 154—110)

This invention relates to contoured sheet material, and more particularly to contoured rubber floor mats having a fabric surface layer bonded thereto.

In the manufacture of automotive floor mats, there has been an increasing demand for an inexpensive mat which would nevertheless be provided with a fabric upper surface to afford the general appearance of expensive carpet. It has become a fairly common practice to insert small sections of carpet in various areas of rubber floor mats, but this is obviously a relatively expensive procedure while at the same time not affording an over-all carpet appearance. Collins Patent 2,258,238 and Cotterman Patent 2,296,502 disclose methods of manufacturing composite floor mats comprising a flexible sheet of vulcanizable material such as rubber and a tread portion formed of a pile fabric such as carpeting. Composite sheet material of this type may be flexed and thereby caused to follow a more or less cylindrical contour or hump in the floor of an automobile, but unfortunately in most modern automobiles the floor, and especially the floor in the front portion of the automobile, is humped in an irregular manner requiring that the floor mat be cupped or dished to conform to the same. With the ordinary rubber mat, this is achieved simply by molding the mat to the exact contour of the floor on which it is to be placed. When an uncured rubber blank is bonded to the underside of carpeting or like fabric and the composite sheet material then molded and vulcanized, it is found that the carpet refuses to conform properly to the mold contours, causing creases and ridges, and also the rubber backing material, ordinarily largely reclaim stock, is subjected to localized stresses and strains which result in tearing and splitting. To overcome this difficulty, some mats have been made by first slitting and tailoring the carpet layer in order to cause it to conform to the desired contour and thereafter applying the rubber blank for molding and vulcanizing therewith. Any such procedure is obviously very time-consuming and expensive, and does not produce the smooth effect desired.

It is accordingly a principal object of our invention to provide a novel composite contoured sheet material such as an automotive floor mat, having a flexible plastic backing layer (ordinarily rubber) and an uninterrupted upper surface layer of a fabric bonded thereto and conforming to the same contours without deleterious strains or stresses therein.

It is a further object to provide a method of producing such novel article which will not require tailoring, slitting and the like to cause the fabric layer to conform to the desired contour.

A further object is to provide a method for raising the nap of the fabric layer after such fabric layer and plastic backing layer have been subjected to molding pressure together.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
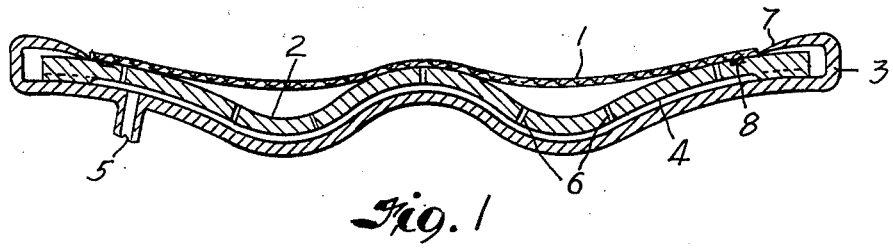
Fig. 1 is a diagrammatic transverse section through a suction mold of the type ordinarily employed in the manufacture of contoured rubber floor mats showing a sheet of textile fabric placed thereon.

In one embodiment of our invention, a sheet of textile fabric 1 such as Jacquard carpet having on its underside a thin coating of an appropriate sizing material such as rubber latex, starch or glue, is wetted and placed in inverted position on a conventional contoured mold (Fig. 1). Such mold ordinarily comprises the contoured platen 2 supported on a vacuum backing on the housing 3 affording a cavity 4 therebetween to which vacuum may be applied through connection 5 and transmitted to the upper surface of the mold platen through vents such as 6 and the peripheral feathered edge 7. A carding cloth strip 8 encircles the periphery of the platen to engage the outer edge portions of the textile sheet 1 to prevent shifting thereof.

Figure 2:
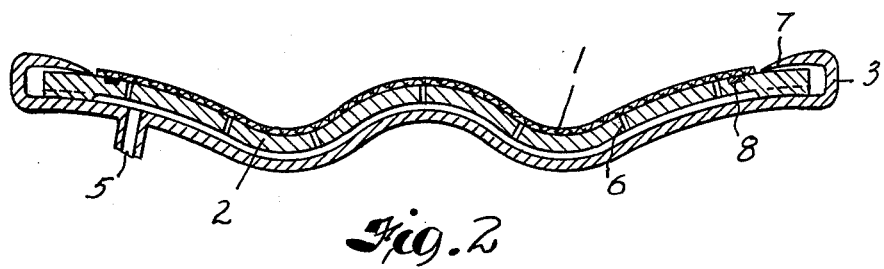
Fig. 2 shows sized and wetted fabric conformed to the contour mold surface.
Figure 3:
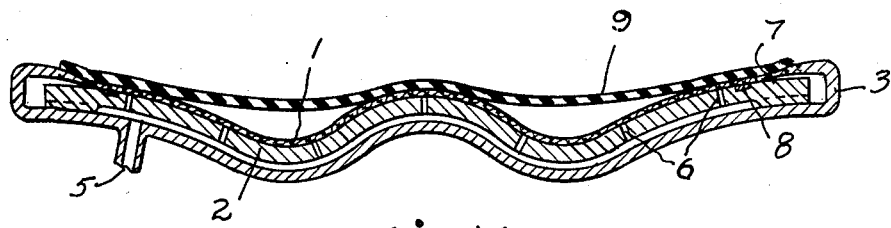
Fig. 3 shows such preformed carpet now dried and with a layer of rubber backing stock superimposed thereon.
Figure 4:
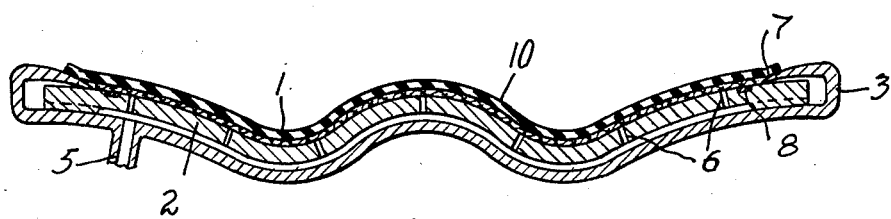
Fig. 4 shows such backing stock drawn down upon the preformed dried fabric of Fig. 3 or (alternatively) drawn down simultaneously with the dry, non-preformed fabric of Fig. 1.

As shown in Fig. 2, the wet sized fabric is now pressed down into the mold and caused to conform thereto, vacuum alone ordinarily being insufficient to achieve this result due to the fact that such sized material is still somewhat porous. The molds may ordinarily be contained in an alligator mold chamber of the general type shown in Grover Patent 2,623,242, for example, to which steam may be admitted and the carpet dried in such contoured condition. The dried and stiffened contoured carpet may then be overlaid with a conventional reclaim rubber mat blank 9 (Fig. 3) and suction applied to the mold to draw such blank firmly against the carpet 1 (Fig. 4), in which condition it is cured in the normal manner, the sizing facilitating bonding of the rubber to the carpet material. The carpet pile surface is, of course, pressed against the surface of mold platen 2 during these latter operations with resultant flattening of the same. We have found that if such pile surface is subsequently treated with hot water, it may readily be raised again to afford its original attractive appearance.

In performing the preforming of the fabric to desired contour, previously sized fabric may simply be placed in a steam press having male and female platens and formed to desired contour thereby, the steam softening the size. Such preformed fabric is then dried before being transferred to a suction mold for application of the rubber mat blank thereto.

When the contour which it is desired to produce is relatively shallow, the operation may be performed without thus preforming the fabric component. The fabric and separate rubber blank are merely placed upon the suction mold and drawn down together (the rubber blank affording an air seal) and cured. Inasmuch as the peripheral edge portions of the fabric are secured against slipping by the carding cloth strip 8, it is obvious that the carpet must stretch rather than slip to conform to the mold contours. This means that unsightly wrinkles and folds are avoided, but also means that the carpet material must be of a type capable of such stretching. As indicated above, Jacquard material is considered especially suitable, the sizing serving to hold the loops together prior to bonding to the rubber backing. Of course, if the fabric were preliminarily bonded to the uncured rubber blank, such stretching of the fabric to conform to the mold contour would be very slight and the results quite unsatisfactory. The rubber backing is cured to flexible condition (similarly to the ordinary rubber automobile mat) whereby the same may be caused exactly to conform to the automobile floor when installed while also presenting a much improved appearance due to the carpet surface.

In general, we may employ loop or cut pile fabrics on a woven or knit and sized backing having sufficient stretchability in all directions to conform to the desired contour when wet. As above indicated, Jacquard material has proven especially suitable. Such stretchable sized materials are commonly employed in upholstering furniture and automobile seat cushions and backs. The size serves a principal function of holding the loops of the material together but in our new process also may be utilized to stiffen the carpet in its preformed shape and assist in bonding such carpet to the rubber backing. Suitable sizing materials include rubber and polyvinyl latices, animal and vegetable glues, and starches. No special bonding agent such as rubber cement is required to be employed between the carpet and rubber backing layers.

A wide variety of rubber, vinyl and other plastics may be employed as the backing layer, but it is a principal object of our invention to provide a superior carpet type mat which will, however, be relatively inexpensive due both to economy of manufacture and the employment of very inexpensive backing material. We accordingly ordinarily prefer to employ a reclaim rubber base stock as such backing material which may have the following formulation:

|   | Parts |
|---|---|
| Natural rubber | 8.05 |
| Modified whole tire reclaim (non-staining) | 81.15 |
| Semi reinforcing carbon black | 3.65 |
| Softener (stearic acid) | .50 |
| Black ground cured scrap (15 mesh) | 5.00 |
| Sulphur | .80 |
| Zinc oxide | .40 |
| Accelerators (benzothiazyl disulfide) | .45 |
|   | 100.00 |

This base stock is compounded to suitable batch size (e.g. 450 pounds) and placed in a Banbury mixer where the rubber and reclaim is broken down and blended for a two-minute period. The remaining materials are then added and mixing continued until thoroughly mixed, usually about four more minutes. The batch is next dropped on a conventional rubber mill and blended by working the stock from one end to the other for about two minutes. It can then be slabbed off, cooled, stacked and stored, or by suitable conveyor means a ribbon of stock can be cut with take-off knives and conveyed to the warm-up or blending rolls of the calender warm-up mills. Similar belts and knives are used to bring the stock to the calender which is set to a definite gauge, such as 80, plus or minus 3.

The calendered sheet which now has a definite width and thickness is fed through a soaping solution (2% Ivory soap) which is applied to one side only. A zinc stearate slurry is applied to the opposite side and excess of both liquids is removed by means of squeeze rolls. The treated sheet material then passes through a cooling chamber to bring its temperature below 125° F. and to dry so that it may be "clicked" to approximate mat size and the resultant mat blanks stacked.

Modified whole tire "reclaim" is made by the usual reclaiming methods and then adding plasticizers and/or pigments to produce a finished reclaim which is not too soft and tacky for use as mat stock.

The twisted Jacquard loops tend to flatten down when the carpet is steamed and pressed and we have found that they may subsequently be raised by treatment of the finished article with hot water. Brushing is not ordinarily necessary although it may be desirable with some types of pile materials. A preferred carpet material is a loop pile frieze and will preferably have a stretchability of at least 2%, and a minimum stretchability of 1%, in order to be useful for employment in accordance with our invention. A knitted back boucle fabric has proven particularly successful for our purpose.

It will be seen that we have accomplished the objects of our invention in an inexpensive and practical manner. A rubber backed contoured carpet is provided without seams, slits or wrinkles in the carpet and without undue stresses and splitting in the cheap reclaim rubber back. Such backing layer can accordingly be of substantial thickness. As indicated, other plastic materials such as neoprene, the vinyl plastics, and the like may be utilized as backing material if desired, but a principal advantage of the invention resides in the fact that reclaim rubber may be employed without deleterious effect. When the plastic is set by curing or otherwise, the resultant composite article has the desired contour but is nevertheless flexible. The carpet or other fabric web material is stretched to conform to such contour but the plastic layer is conformed thereto by plastic flow. Such plastic flow is facilitated by the fact that the plastic material is applied as a separate sheet not preliminarily bonded to the carpet.

Other modes of applying the principle of the invention may be employed, change being made as regards the details described, provided the features stated in any of the following claims or the equivalent of such be employed.

We therefore particularly point out and distinctly claim as our invention:

1. The method of making a carpet surfaced plastic sheet of non-planar contour which comprises placing sized stretchable carpet material on a mold of desired contour, wetting such size to soften the same, securing only the edges of such carpet against slipping, stretching such carpet to conform to such contour, drying such size to set such carpet in such pre-formed condition, placing a separate blank of uncured moldable rubber upon such carpet, drawing such blank down upon such pre-formed carpet by means of suction to join them together, and then curing such rubber to form a composite flexible article.

2. The method of making a carpet surfaced plastic sheet of non-planar contour which comprises placing stretchable carpet material in a mold of desired contour, securing only the edges of such carpet against slipping, stretching and conforming such carpet material to such contour, placing a separate blank of moldable plastic material over such conformed carpet material, molding such blank to such contour by plastic flow, and then securing the conformed carpet material and conformed blank together.

3. The method of making a carpet surfaced plastic sheet of non-planar contour which comprises placing stretchable carpet material in a mold of desired dished contour, securing only the edges of such carpet against slipping, stretching such carpet material to conform to such contour, setting such carpet material in such pre-formed condition, placing a separate blank of moldable plastic material upon such carpet, molding such plastic blank against such preformed carpet, and then securing the conformed carpet material and conformed blank together and setting such plastic in flexible condition.

4. The method of making a carpet surfaced rubber floor mat having a substantial desired hump therein which comprises placing a stretchable carpet upon a suction mold of the desired contour, securing only the edges of such carpet against slipping, stretching and conforming the carpet to the mold, placing an uncured rubber mat blank over the back of such carpet without adhering the blank thereto, applying suction to draw such blank against such carpet, and curing such blank to provide a flexible rubber-backed contoured carpet with such rubber bonded to such carpet but without deleterious concentrations of stress where changes in contour occur.

5. The method of making a carpet surfaced rubber floor mat having a substantial dished hump therein which comprises placing carpet material capable of stretching at least about one percent upon a support of the desired humped contour, securing only the edges of such carpet against slipping, steaming and pressing such carpet to cause it to assume such contour, drying such carpet to ensure retention of such contour, transferring such preshaped carpet to a suction mold of the same contour with the decorative surface of such carpet opposed to such mold, placing an uncured rubber mat blank upon the exposed back of such carpet, applying suction firmly to draw and mold such blank to the back of such carpet, and then curing such blank to provide a rubber-backed contoured carpet without consequential concentrations of stress therein where changes in contour occur.

6. A method as defined in claim 5 wherein such stretchable carpet material is Jacquard carpet.

7. A method as defined in claim 5 wherein such stretchable carpet material is knitted back boucle fabric web material.

References Cited in the file of this patent

UNITED STATES PATENTS

| | | |
|---|---|---|
| 1,475,623 | Egerton | Nov. 27, 1923 |
| 1,868,170 | Jasgur | July 19, 1932 |
| 1,994,145 | Moule | Mar. 12, 1935 |
| 1,999,441 | Clark | Apr. 30, 1935 |
| 2,032,832 | Blair et al. | Mar. 3, 1936 |
| 2,089,598 | Cavanagh et al. | Aug. 10, 1937 |
| 2,258,238 | Collins | Oct. 7, 1941 |
| 2,266,846 | Buff | Dec. 23, 1941 |
| 2,292,103 | Cotterman | Aug. 4, 1942 |
| 2,296,502 | Cotterman | Sept. 22, 1942 |
| 2,444,394 | Arnold | June 29, 1948 |
| 2,531,218 | Johnson | Nov. 21, 1950 |
| 2,590,221 | Stevens | Mar. 25, 1952 |